United States Patent [19]

Barth

[11] Patent Number: 4,776,824

[45] Date of Patent: Oct. 11, 1988

[54] CIRCUMFERENTIALLY RESILIENT COUPLER

[75] Inventor: Thomas Barth, Darmstadt, Fed. Rep. of Germany

[73] Assignee: Firma Carl Freudenberg, Weinheim/Bergstr., Fed. Rep. of Germany

[21] Appl. No.: 924,202

[22] Filed: Feb. 28, 1986

[30] Foreign Application Priority Data

Jan. 16, 1986 [DE] Fed. Rep. of Germany ....... 3601080

[51] Int. Cl.$^4$ ............................ F16D 3/52; F16D 3/78
[52] U.S. Cl. ........................................ 464/98; 464/160
[53] Field of Search ................. 464/81, 84, 89, 91, 464/92, 96, 98, 99, 100, 101, 51, 82, 160; 192/106.1

[56] References Cited

U.S. PATENT DOCUMENTS

| 1,283,787 | 11/1918 | Jencick | 464/99 |
| 1,460,212 | 6/1923 | Olive | 464/98 |
| 2,053,849 | 9/1936 | Spase | 192/106.1 |
| 2,281,898 | 5/1942 | Whitten | 192/106.1 |
| 2,407,757 | 9/1946 | MacCallam | 464/98 X |
| 2,855,767 | 10/1958 | Ahlen | 464/98 |
| 3,788,099 | 1/1974 | Miller | 464/98 |
| 3,985,000 | 10/1976 | Hartz | 464/99 |
| 3,987,645 | 10/1976 | Koster et al. | 464/98 |
| 4,044,628 | 8/1977 | Jacks | 464/98 X |
| 4,191,032 | 3/1980 | August | 464/82 |
| 4,206,617 | 6/1980 | Nakamoto | 464/99 |

FOREIGN PATENT DOCUMENTS

| 236150 | 1/1969 | U.S.S.R. | 464/98 |
| 461732 | 2/1937 | United Kingdom | 192/106.1 |

Primary Examiner—Daniel P. Stodola
Attorney, Agent, or Firm—Felfe & Lynch

[57] ABSTRACT

A coupler for coupling inner and outer, radially-spaced, rotatable machine components has a generally annular body for location in the radial space between the machine components. Inner and outer drive element devices project from the generally annular body for respectively engaging drivingly the inner and outer machine components. At least one of the drive element devices is at least one at least circumferentially-resilient spring leaf projecting from the generally annular body at one end with a drive element for engaging the machine component engaged thereby on the other end.

3 Claims, 3 Drawing Sheets

CIRCUMFERENTIALLY RESILIENT COUPLER

BACKGROUND OF THE INVENTION

The invention relates to a circumferentially resilient coupler for inner and outer, radially-spaced, rotatable machine components.

A coupler having circumferential flexibility for torsional vibration damping is disclosed in German patent No. 321,098. In it, both drive elements of the coupler and drive surfaces of the machine components cooperative therewith for the coupling of the coupler are rigidly associated with their respective devices. As a result, there would be a sudden, impulse increase in power when they come into contact with each other. This could damage the coupled machine components which is why, in the coupler of the patent, a liquid damping medium is used between the drive elements and drive surfaces. However, this makes it necessary to seal between the coupler and machine components. The manufacturing cost of the device is, therefore, high and the device, prone to malfunction.

SUMMARY OF THE INVENTION

An object of the invention is, therefore, to improve a coupler for inner and outer, radially-spaced, rotatable machine components in such a way that damage to the coupled machine components from at least rotationally-driven, impulse overloads is substantially prevented with a coupler of simple construction and reliable operation.

In accordance with the invention, this and other objects are accomplished in a coupler for coupling across the radial space between inner and outer, radially-spaced, rotatable machine components. The coupler has a generally annular body for positioning in the radial space between the machine components and drive devices for couplingly engaging each of the machine components. At least one of the drive devices is an at least circumferentially-resilient spring leaf, one end of which projects from the generally annular body and the other, inner or outer end, radially more remote from the generally annular body, carries a drive element for the coupling engagement to the corresponding, inner or outer machine component. The machine components connected by the coupler are, thus, resiliently coupled to each other at least circumferentially. As a result, sudden, at least rotational impulse overloads therebetween are resiliently absorbed and unable to damage to the coupled machine components.

The specific design of the coupler of the invention depends largely on the quantity required and on the overall size. The preferably plural drive elements and spring leaves and the generally annular body can be fabricated separately and then combined in an assembly operation. This design makes it possible to select the material for each part of the coupler best suited to the requirements it has to meet, and then to design these parts optimally. However, it does entail relatively high manufacturing costs and, therefore, for many applications, a design in which some or all of the parts of the coupler are fabricated as a unit is preferred.

All of the parts of the coupler, the spring leaves, drive elements and generally annular body, may be fabricated as a unit at least when all have the same dimension in the axial direction. This makes the coupler particularly easy to fabricate, for example, by punching it as a unit from sheet stock having sufficient elasticity. Steel and spring steel sheet stock have proved to be particularly well suited for this. Elastomeric and thermoplastic sheet materials can also be used.

If the punching operation does not permit the coupler to be made sufficiently thick in the axial direction, a number of coupler plates may be produced in this way and then axially stacked to the necessary thickness before installation as a coupler for coupling between the machine components. The individual coupler plates will then back one another up in their action, which will make it possible to absorb larger torques elastically, as with an axially-thicker coupler. While joining the individual plates together axially will not have a pronounced effect on the operation of the stacked coupler plates, it will facilitate installation. Such joining of the coupler plates prior to their installation can be effected by adhesive bonding, brazing, bolting or riveting them to one another.

In the unit of another design, the drive elements may interact with the generally annular body of the coupler as a stop. For this, the generally annular body has contact surfaces engageable with the drive elements when the spring leaves flex but, in the unloaded state, i.e. when the spring leaves are not resiliently flexed, spaced from the drive elements. The contact surfaces therefore limit the impulse-load-induced yielding motion of the drive elements on the spring leaves to a fixed value which is important in certain applications.

In another design, the spring leaves are configured in the radial direction of the coupler. This softens the spring action of the spring leaves, which is often desirable. It has proved particularly advantageous in a design of this type to incline the spring leaves in the opposite direction of rotation.

BRIEF DESCRIPTION OF THE DRAWING

Merely preferred embodiments, which illustrate but do not limit the invention, will now be described in greater detail with reference to the accompanying drawing, wherein.

DESCRIPTION OF THE PREFERRED EMBODIMENTS

Figure 1:
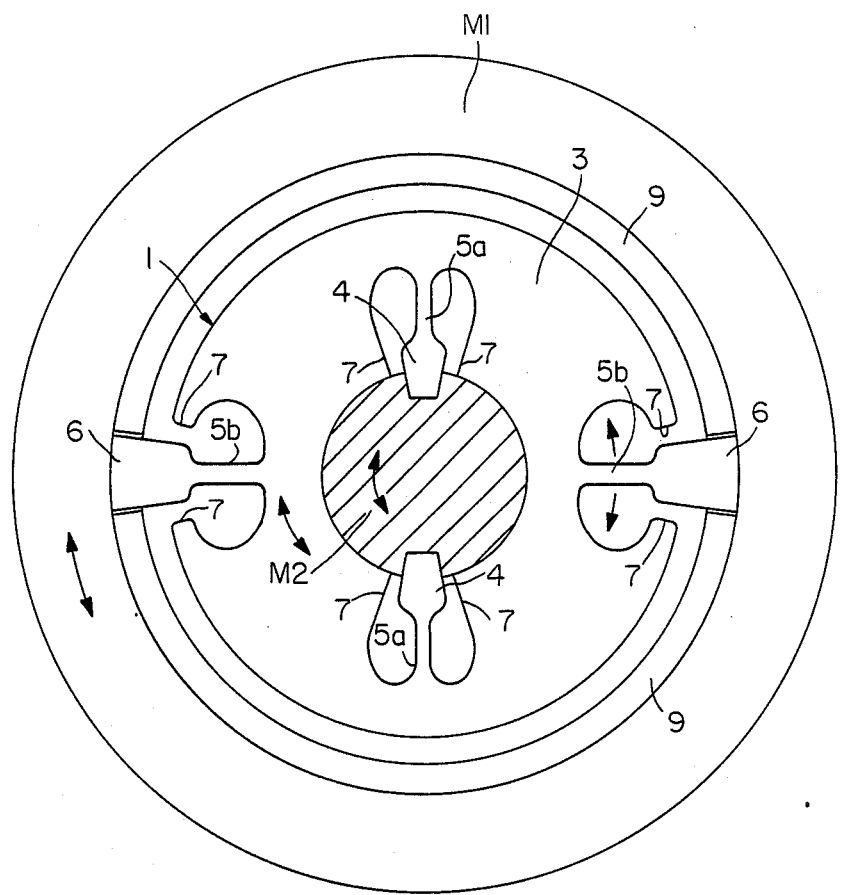
FIG. 1 is a plan view of one preferred embodiment, in its installed state together with machine components coupled thereby, one machine component being in section.

The coupler at 1 in FIG. 1 serves for torque transmission between outer and inner, radially-spaced, rotatable machine components M1 and M2, respectively. The coupler is one piece, punched from a steel sheet. It has a generally annular body coaxially in the radial space between the machine components, at least circumferentially-resilient spring leaves 5a, 5b projecting, respectively, inwardly and outwardly from one end on the generally annular body, and drive elements 4, 6 on the other, innermost and outermost ends of spring leaves 5a, 5b for couplingly engaging the inner and outer machine components, respectively. The spring leaves project from recesses in the generally annular body and the drive elements extend into the recesses, circumferentially spaced from contact surfaces 7 on the circumferentially-opposite sides of the recesses when the spring leaves are unflexed, i.e. in the unloaded state.

The coupler at 1 therefore couples the inner and outer machine components M1, M2 for steady-state rotation together with the coupler in the position shown and impulse-responsive, resilient relative rotation upon circumferential flexing of the spring leaves 5a, 5b, as limited by the contact surfaces 7. To improve its relative-rotation mobility in the circumferential direction, a sliding shell 9 slidably connects the outer drive elements 6 to the outer machine component M1. The drive elements are distributed uniformly about the peripheries of the coupling for rotational balance of mass and force. Any load-induced yielding motion of the coupler in the radial direction is also uniformly opposed in this way.

So far as the operating behavior is concerned, the following should also be noted: The torque to be transmitted between the inner and outer machine components M2, M1 is transmitted by way of both leaf springs 5a, 5b which carry the inner and outer drive elements 4, 6 between the inner and outer machine components. The coupler at 1 is, therefore, capable of relative rotation with respect to either or both of the inner and outer machine components M2, M1. The elastic yielding of either or both groups of the inner and outer spring leaves 5a, 5b (which are not necessarily the same) thus comes into play partially or fully. This assures that various spring characteristics, as required, can be realized. Torsional vibrations of the machine components connected by the coupler can thus be reliably isolated.

With increasing relative angular displacement of the machine components connected by the coupler, the inner and/or outer drive elements 4 and/or 6 come to bear, either simultaneously or successively, on the contact surfaces 7 of the generally annular body 3 located ahead of them in the direction of the impulse of the relative rotation. While some springiness is present even then due to the capacity of the spring leaves 5 to bulge out elastically, the overall torsional elasticity of the embodiment is then characterized by a pronounced progressiveness that permits the transmission of the maximum torque.

Figure 2:
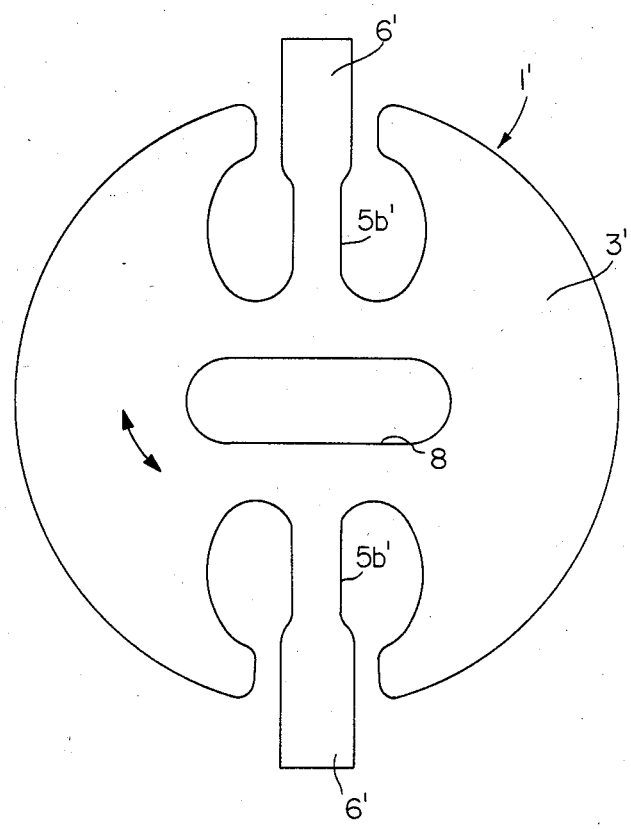
FIG. 2 is a plan view of another preferred embodiment.
Figure 3:
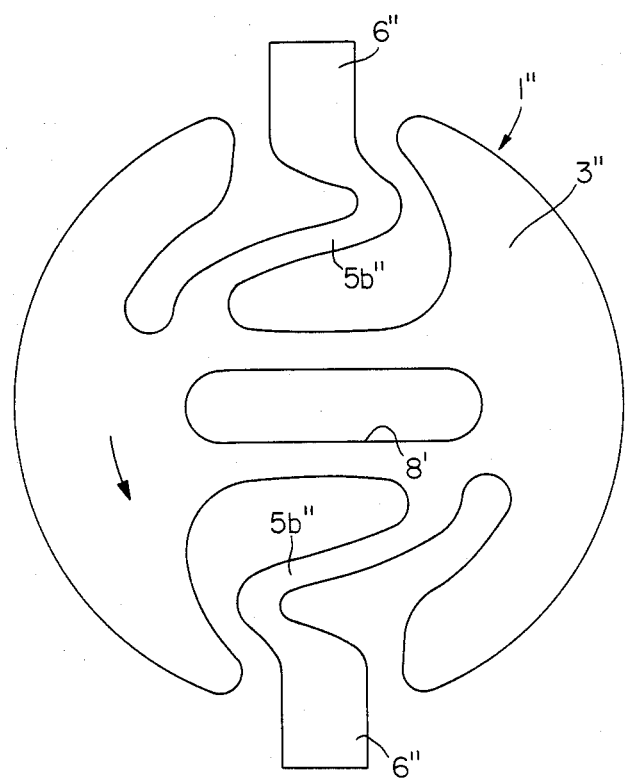
FIG. 3 is a plan view of still another preferred embodiment.

The embodiments of couplers at 1', 1" shown in FIGS. 2 and 3 function similarly to the one just described with inner and outer, radially-spaced machine components which are not shown in these Figures. However, both embodiments have only the outer spring leaves 5b', 5b" and drive elements 6', 6". The inner drive element is formed by a slot 8, 8' for rigidly associating the generally annular body 3', 3" of the coupler with the inner machine component (not shown). Thus, although the function is substantially the same as in the embodiment described with respect to FIG. 1, the effect of differing or additional resilience of the omitted inner spring leaves cannot be obtained.

The embodiment of FIG. 3 further differs in that its outer spring leaves 5b" project from the annular body 3" at an incline counter to the direction of rotation. The radial and circumferential spring action resulting from this is softer than in the embodiments of FIGS. 1 and 2 in which the spring leaves 5a, 5b, 5b' project substantially radially. The incline and the 90-degree relationship between the longitudinal direction of the slot 8' and the diametric orientation of the outer drive elements 6" also make it possible to compensate for any axial misalignment of the machine components connected by the coupler if there is sufficient play between them and the slot 8' and/or drive elements 6". In most practical embodiments, this condition can be readily satisfied. The coupling of the embodiment of FIG. 3 is, therefore, particularly easy to use. All of the preferred embodiments, being one piece, are distinguished by extreme reliability of operation.

It will be appreciated that the instant specification and claims are set forth by way of illustration and not of limitation, and that various changes and modifications may be made without departing from the spirit and scope of the present invention.

What is claimed is:

1. A coupler for coupling inner and outer, radially-spaced, rotatable machine components, comprising:
   a generally annular body having an axis of rotation for location in the radial space between inner and outer, radially-spaced, rotatable machine components; and
   inner and outer drive element means integral with and extending in a substantially radial direction with respect to the axis of rotation of the generally annular body for respectively engaging drivingly the inner and outer machine components, at least one of the drive element means comprising at least one at least circumferentially-resilient spring leaf projecting from the generally annular body at one end with a drive element for engaging the machine component engaged thereby on the other end which is a free projecting end;
   wherein said generally annular body has a recess and the one end of the spring leaf projects from this recess, the recess having contact surfaces spaced from circumferentially opposite sides of the drive element when the spring leaf is not circumferentially flexed, the drive element at the free projecting end of the at least one circumferentially resilient spring leaf bearing against a contact surface of the recess when the spring leaf is circumferentially flexed under transmission of maximum torque.

2. The coupler of claim 1, wherein the spring leaf projects from the generally annular body at an incline to a radial direction thereof from the one end of the spring leaf.

3. The coupler of claim 2, wherein the incline of the projection of the spring leaf is in the opposite direction the machine components are rotatable.

* * * * *

UNITED STATES PATENT AND TRADEMARK OFFICE
CERTIFICATE OF CORRECTION

PATENT NO.    : 4,776,824
DATED         : October 11, 1988
INVENTOR(S)   : Thomas Barth It is certified that error appears in the above-identified patent and that said Letters Patent is hereby corrected as shown below:

On the Title page, item [22] Filed:

"Feb. 28, 1986" should read

-- Oct. 28, 1986 --.

Signed and Sealed this

Thirty-first Day of August, 1993

*Attest:*

BRUCE LEHMAN

*Attesting Officer*    *Commissioner of Patents and Trademarks*